ations in the atmospheric pressure increase or reduce the height of the mercury column. Also, an increase in pressure applied to the hypsometric liquid reduces the height of the mercury column since the liquid rests directly on the mercury. The hypsometric liquid is heated in a controlled manner to produce a vapor that exerts pressure on the liquid and the mercury column. As the temperature is increased by the heater, the mercury moves down the tube until it reaches a constant or fixed level at which sensor electronics adjust the power to the heater so that the top of the mercury column remains exactly at this fixed level. The pressure on the liquid is determined by measuring the temperature inside the hypsometric chamber. Atmospheric pressure is essentially equal to the hypsometric chamber pressure plus the pressure equivalent of the mercury column.

United States Patent

Lichfield

[15] 3,701,283
[45] Oct. 31, 1972

[54] PRESSURE-SUBTRACTING HYPSOMETRIC APPARATUS

[72] Inventor: Ernest W. Lichfield, Boulder, Colo.

[73] Assignee: The United States of America as represented by the Secretary of the Navy

[22] Filed: Oct. 26, 1970

[21] Appl. No.: 84,029

[52] U.S. Cl. ................................... 73/401, 73/398 R
[51] Int. Cl. ................................................ G01l 7/18
[58] Field of Search ..... 73/385, 384, 401, 345, 398 R

[56] References Cited

UNITED STATES PATENTS

| 2,459,268 | 1/1949 | Elkins ........................... 73/300 |
| 2,758,476 | 8/1956 | Donald et al. ............ 73/401 X |

*Primary Examiner*—Donald O. Woodiel
*Attorney*—Richard S. Sciascia and Paul N. Critchlow

[57] ABSTRACT

A hypsometric liquid such as water is supported in a closed chamber on a tubular column of mercury, the mercury being exposed in a manometric manner to atmospheric pressure so that vari The invention described herein may be manufactured and used by or for the Government of the United States of America for governmental purposes without the payment of any royalties thereon or therefor.

7 Claims, 9 Drawing Figures

INVENTOR.
ERNEST W. LICHFIELD,

ATTORNEY.

PRESSURE-SUBTRACTING HYPSOMETRIC APPARATUS

BACKGROUND OF THE INVENTION

The present invention relates to the measurement of atmospheric pressure and particularly to hypsometer-type measurements.

A hypsometer is a device that determines pressure by measuring the boiling temperature of a liquid, this boiling temperature varying with atmospheric pressure. In general, however, hypsometers have been used primarily as pressure-measuring devices on balloon flights, examples being the AN/AMQ–12 radiosonde hypsometer used for measuring pressures above 80 millibars (mbs) and a hypsometer developed by Wagner at Air Force Cambridge Research Laboratories for use on large-scale, high-altitude balloon flights. The reason for the limited use of the hypsometer is that its sensitivity increases as the pressure decreases so that it is ideally suited for measurement of low pressures. Conversely, hypsometers seldom are used as pressure-measuring devices at a near sea level pressure because at higher pressures there are very small changes in boiling temperature per millibar of pressure change. Also, it is difficult to measure accurately the boiling temperature of a liquid at sea level.

It is recognized that, if a fixed amount of sea level atmospheric pressure could be subtracted so as to leave only a small portion of its pressure remaining, a hypsometer could measure the reduced pressure with increased sensitivity and the greater the pressure reduction the greater would be the sensitivity. However, as far as presently is known, prior art pressure-measuring devices have not made use of this phenomenon. Obviously, if changes in the atmospheric pressure were directly reflected in the smaller portion of the pressure used for the measurements, the resulting device not only would be more sensitive but would provide accurate determinations of the atmospheric pressure variations. These results are possible if the amount of sea level atmospheric pressure subtracted from the total atmospheric pressure is a fixed amount. The remaining pressure varies with atmospheric pressure variations. For this reason, the present apparatus is called a 'pressure-subtracting hypsometer.'

THE OBJECTS

It is therefore an object of the present invention to provide hypsometric apparatus capable of subtracting a fixed amount of sea level atmospheric pressure from the total pressure to be measured so as to permit the measurements to be made on only a small portion of the pressure remaining after the subtraction.

Another object is to provide an accurate and stable apparatus of the type contemplated in the foregoing object and, for this purpose, the invention provides apparatus that is insulated from environmental temperature changes as well as apparatus having the stability of a conventional mercury barometer.

Another more general object is to provide similar apparatus having much improved sensitivity, as well as mechanical simplicity and the adaptability for telemetry which customarily is available with the conventional hypsometer.

Another object is to provide apparatus ideally suited for use in automatic weather stations or installations where remote readout is required.

Other objects and their attendant advantages will become more apparent in the ensuing description.

SUMMARY OF THE INVENTION

The objects are achieved by supporting a supply of hypsometric liquid, such as water, on a column of mercury which preferably is a vertical column the lower portion of which is bent in the form of a U-tube and provided with a mercury reservoir exposed to the atmosphere. Other known mercury reservoir shapes and columns can be used, it being understood that the present description utilizes the U-tube configuration primarily as a representative means for implementing the basic principles upon which the invention is based. Heating means are provided for boiling or vaporizing the hypsometric water and other means employed to control the heating means. A temperature probe is used to measure the boiling temperature of the hypsometric water and, most suitably, this means is provided by a thermistor inserted into a chamber employed to contain the hypsometric liquid. The thermistor has external leads enabling its coupling to a suitable recorder which can be disposed at a remote position or, if desired, telemetry techniques can be employed.

Such an apparatus permits pressure determinations in which the pressure being measured is limited only to the vapor pressure produced by boiling the hypsometric liquid. Thus, according to the method employed in the present invention, the hypsometric liquid is heated until the pressure produced by its resulting gaseous or vapor state forces the level of the mercury column on which the hypsometric liquid rests to move downwardly of the mercury tube to a fixed, predetermined level at which point the temperature of the heated hypsometric liquid is determined. This particular temperature, of course, is a function of the pressure acting on the liquid that is being heated and, in turn, the pressure acting on this liquid is a function of the atmospheric pressure to be determined. More specifically, the atmospheric pressure to which the mercury column is exposed equals the pressure equivalent of the mercury column plus the vapor pressure acting on the hypsometric liquid plus the pressure equivalent of the hypsometric liquid contained in the hypsometric chamber. Since, in effect, the present apparatus measures the amount of vapor pressure needed to force the mercury column downwardly against atmospheric pressure and since the present technique requires that this particular vapor pressure be sufficient to always produce a mercury column of a fixed height and therefore of a fixed pressure equivalent, the hypsometric chamber pressure that is measured becomes a direct function of atmospheric pressure. However, the chamber pressure is only a small portion of the total atmospheric pressure so that the desired sensitivity is achieved.

The method of the invention can be accomplished in a number of ways. As will be recognized, it broadly contemplates using vapor pressure generated by boiling the volatile hypsometric liquid to partially counteract the environmental atmospheric pressure acting on an object or mass of a known weight. If the mass is so supported that its initial disposition is directly related to environmental atmospheric pressure, the variations in vapor pressure needed to move the mass against atmospheric pressure to a predetermined position or level will provide reliable data for determining the atmospheric pressure. The vapor pressure needed to produce the movement again is determined by the temperature at which the required vapor pressure is generated. Sensitivity is achieved if the required vapor pressure is substantially less than environmental atmospheric pressure.

BRIEF DESCRIPTION OF THE DRAWINGS

The present invention is illustrated in the accompanying drawings of which

DETAILED DESCRIPTION OF THE INVENTION

Figure 1:
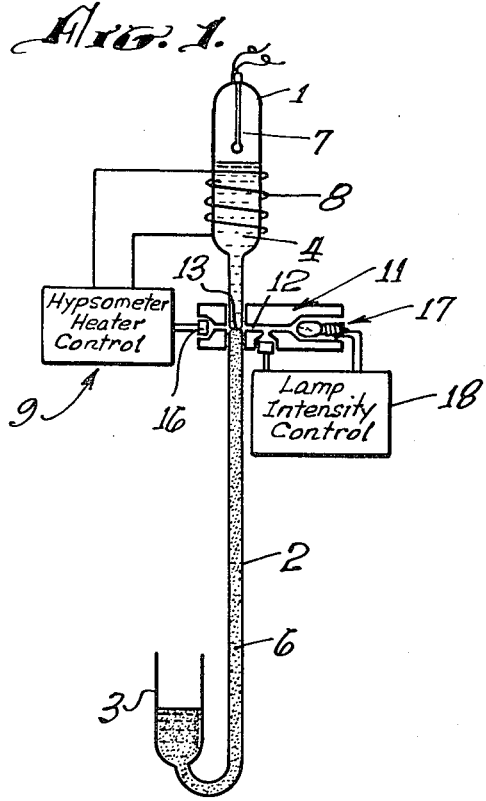
FIG. 1 is a schematic view of the apparatus of the present invention.

The apparatus shown in FIG. 1 generally is in a form of an elongate tubular member having a chamber portion 1 and an elongate tubular portion 2 the lower end of which is in the shape of a U to provide a mercury reservoir 3. Chamber 1 is identified for present purposes as a hypsometric chamber, this term connoting the face that the chamber contains a supply of hypsometric liquid such as distilled water 4. Similarly, tubular portion 2 is identified for present purposes as a manometric column filled with a liquid such as mercury 6 and since chamber 1 forms a continuation of the tubular column, the water in chamber 1 rests upon or is physically supported by the mercury in chamber 6. Consequently, pressure exerted upon the surface of water supply 4 tends to decrease the height of the mercury column.

As will be noted, chamber 1 is only partially filled with the hypsometric liquid and a temperature probe, such as a thermistor 7, projects into a position spaced slightly above the level of liquid 4. Also, chamber 1 is a closed chamber which preferably is evacuated to minimize extraneous pressures upon the surface of liquid 4. Heat for the chamber is provided by a nichrome heater member 8 which, in turn, is electrically coupled to a so-called hypsometer heater control 9 shown in block form in FIG. 1. Another component known as a level sensor assembly 11 is associated with heater control 9. These two control members as well as their functions will be considered subsequently in detail. For the present, it can be noted that sensor assembly 11 includes a horizontal passage or path 12 which bisects tubular portion 2 at right angles and at a particular level of the tube identified in FIG. 1 by numeral 13. Also, sensor assembly 11 includes a photoresistor member 14 exposed to path 12 and heater control member 9 also includes a photoresistor member 16 disposed directly in line with path 12 at level 13. A lamp 17 is mounted in sensor assembly 11 at the end of path 12 and light energy from this lamp is transmitted through path 12 to photoresistors 14 and 16. The intensity of lamp 17 is controlled by circuitry contained in a lamp intensity control member 18 also to be subsequently described.

In operation, nichrome coil 8 is heated to supply sufficient heat to hypsometric liquid or water 4 to cause this water to boil so that part of the water changes to its gaseous or vapor state thus exerting pressure on the surface of the water. This pressure, in turn, is applied to mercury column 6 upon which the water rests. At the outset of the operation, or in other words, prior to the application of the heat, mercury column 6 extends upwardly in tubular portion 2 to a point above level 13. The light from lamp 17 then is attenuated by the mercury and photoresistor 16 sees no light. This circumstance permits power to be applied through heat control circuit 9 to nichrome heater 8 and the heating continues until photoresistor 16 sees or receives the light from lamp 17. Thus, photoresistor 16 functions as a switch to turn on or shut off the power supply to heater 8.

As the heating of the water in the hypsometric chamber 1 is continued, the pressure in the chamber increases also causing the boiling temperature of the water to rise. As a result of the increase in the vapor pressure, the mercury level in tube 2 moves downwardly to level 13. As this point, or, in other words, when the mercury level or the interface of the mercury and the water is at level 13 of tube 2, the light energy from lamp 17 is only partially attenuated in a manner that will be described and the power to heater 8 is adjusted by sensor electronics so that the interface of the mercury and the water remains exactly at the sensor level which is level 13. Consequently, the instrument is at equilibrium and pressure can be determined by measuring the temperature inside hypsometric chamber 1.

As will be noted, the pressure affecting the boiling point of the water in the hypsometric chamber is only the vapor pressure within chamber 1 rather than the full atmospheric pressure which commonly is employed in hypsometric measurements. However, atmospheric pressures readily are ascertainable since the atmospheric pressure essentially is equal to the hypsometric chamber pressure plus the pressure equivalent of the fixed mercury column 2. Viewed in another manner, the apparatus permits total atmospheric pressure to be determined by subtracting from the total pressure a fixed amount of sea level atmospheric pressure, this fixed amount being the pressure equivalent of the fixed level of mercury column 2 determined by the positioning of sensing level 13 on the tube. Since the measurements are being made on only a relatively small portion of the total pressure, the hypsometer has greatly increased sensitivity. For example, at pressures equal to sea level values ($\approx 1,000$ mb) the boiling temperature of most liquids will change 0.04C for each 1 mb change in pressure. At 100 mb pressure the temperature change is about 0.2C $mb^{-1}$; at 20 mb the change in the boiling point rises to 0.6C $mb^{-1}$.

Figure 3:
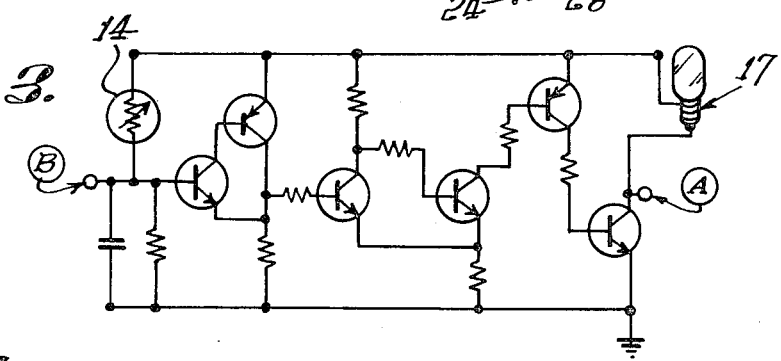
FIG. 3 is a schematic of a lamp-intensity control circuit.
Figure 4:
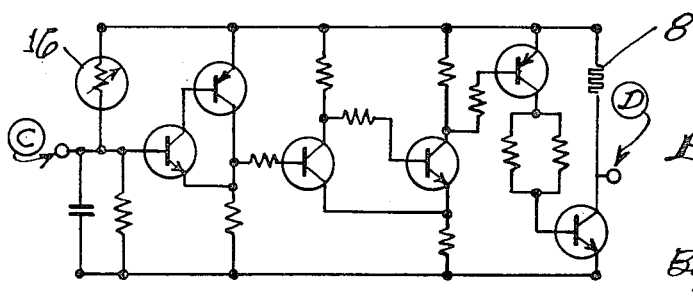
FIG. 4 is a similar schematic of a heater control circuit.
Figure 5:
FIGS. 5–8 are time-related wave forms produced respectively at points A, B, C, and D of FIGS. 3 and 4.
Figure 6:

FIGS. 3 and 4 are schematics of lamp intensity control member 18 and hypsometer heat control member 9. As will be recognized, the circuit details of both of these schematics are entirely conventional and they are shown only to represent one manner in which a particular desired mode of operation can be implemented. As has been stated, the desired mode of operation is one in which the power to the hypsometric chamber heater is adjusted so as to maintain the interface level precisely at level 13 of the tube and, of course, the capability of maintaining this level is a factor affecting the accuracy and reliability of the pressure determinations. As shown in FIG. 3, lamp control circuit 18 includes lamp 17 and photoresistor 14. Photoresistor 14, as shown in FIG. 1, is exposed to the light in passage 12 and this photoresistor functions as a switch to rapidly turn the power to the lamp on and off. The resulting wave form produced at point A is a square wave shown in FIG. 5 which, due to the thermal time constant of the lamp is smoothed out so as to provide at point B a sawtooth lamp intensity wave form such as the wave form illustrated in FIG. 6. Since the lamp's intensity controls the duty cycle of switching, the lamp flickers between fixed light intensity levels.

Figure 7:
Figure 8:

Heater control circuit 9 shown in FIG. 4 is regulated by photoresistor 16 which responds to the flickering lamp intensity. The mercury column acts as an iris attenuating the lamp intensity. When the mercury is well above sense level 13, photoresistor 16 sees no light and the heater is on continuously. When it is below sense level 13, the heater is turned off. However, when the mercury level is very near sense level 13, the light as seen by photoresistor 16 is partially attenuated resulting in the wave form shown at point C of FIG. 4 and illustrated in FIG. 7. Heater power then is switched on and off synchronously with the lamp flicker, the duty cycle being varied by minute changes in the mercury level. The wave form of the heater power taken at point D of FIG. 4 is illustrated in FIG. 8 of the drawings.

When the apparatus is at equilibrium, approximately half of the chamber will contain vapor. Preferably, thermistor 7 is located just above the top of the equilibrium liquid level where it is completely surrounded by the vapor. Since there is very little air or other gases in the chamber, the inner surface of the chamber enclosing the vapor must be at boiling temperature. If any part of this surface cools below boiling temperature, vapor immediately condenses on it, giving up the heat of vaporization and warming the surface. The vapor chamber can never be above boiling temperature since the heating coil is wound around the portion of the chamber containing the liquid. Heat therefore is added to the liquid and lost from the vapor.

Figure 9:
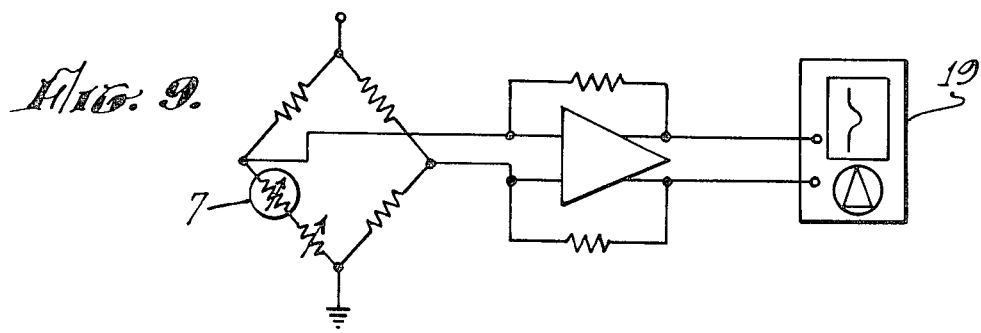
FIG. 9 is a block diagram illustrating one means of measuring vapor temperature.

Preferably, thermistor 7 is wired into a bridge circuit (FIG. 9) so that very small changes in temperature can be measured. Also, the bridge circuit can be amplified in the manner as shown in FIG. 9 and applied to a chart recorder 19 to permit remote readings. When so connected to a strip-chart recorder, the apparatus becomes a microbarograph. The gain of a strip-chart recorder can be adjusted to record large-scale pressure variations, or it can be increased to magnify the pressure trace and show the detail of small-scale pressure variations. The manner in which these functions can be implemented is well known and should need no detailed description. Also, since the output is in an electrical form, it can be displayed in a variety of ways with the hypsometer located in an out-of-the-way place while the readout is transmitted to a desired location.

Figure 2:
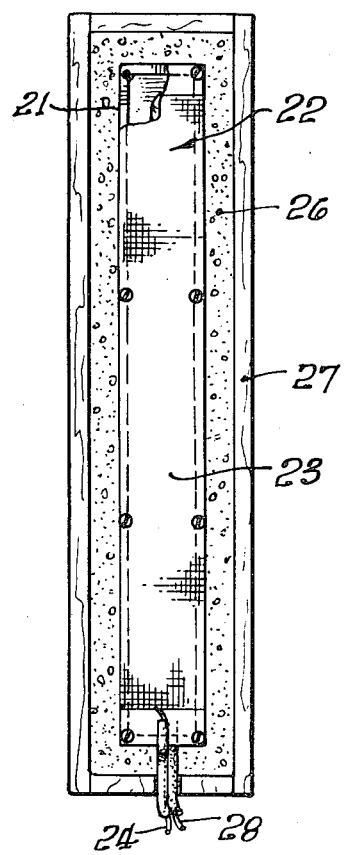
FIG. 2 illustrates a special container employed to encase the apparatus of FIG. 1 and to insulate it from environmental temperature changes.

Another feature of the present invention is the fact that the FIG. 1 apparatus readily can be insulated from environmental temperature changes so as to minimize the effect of these changes on pressure readings. When the pressure-subtracting hypsometer was built and tested, it was found that these temperature environment changes produced a pronounced effect on the pressure readings. A cool draft on the hypsometric chamber could cause as much as a 2 mb excursion in the pressure measurement. However, this effect can be eliminated by encasing the apparatus in a temperature-controlled thermally conductive box such as that illustrated in FIG. 2. As shown in FIG. 2, the entire FIG. 1 apparatus is mounted inside an aluminum channel 21 and a relatively thick-walled aluminum cover 22 is screwed to the face of channel 21 to completely enclose the contained apparatus. Attached to the outside of cover 22 is a nichrome wire heater 23 coupled to a power source by lead 24 and this heater is employed to maintain the temperature of the aluminum enclosure at a particular level which preferably is about 30° C. The entire aluminum enclosure then is covered with about a 1-inch thick layer 26 of insulating foam which, in turn, is encased in an insulating wooden box 27. As shown in FIG. 2, the front face of the foam insulation as well as wooden box 27 has been removed to permit a showing of the interior of the box with the aluminum enclosure and its nichrome wire heater. When such an enclosure is employed, the temperature of the aluminum container is controlled to about 0.1° C and, consequently, no temperature correction such as is used with mercury barometers is required. FIG. 2 also illustrates the face that a lead 28 is employed to provide power for the electrical components of the apparatus encased within the enclosure.

The advantages of the present apparatus should be readily recognizable. In general, it is a device which combines the principles of a hypsometer and a mercury barometer. Thus, it provides the accuracy and stability of a mercury barometer with the sensitivity of an aneroid device and the mechanical simplicity and ease of telemetry of a hypsometer. In this regard, it appears ideally suited for use in automatic weather stations or installations where remote readout is required. Actually, the pressure-subtracting hypsometer is a near analog to a servo-system mercury barometer, i.e., a barometer in which a mercury-level sensor is moved up and down by a servo motor. The advantage of the hypsometer is that the servo action and the level readout are performed without any moving parts. The hypsometer is the analog of the servo motor and the thermistor is equivalent to a position-reading potentiometer. Constructing a pressure-subtracting hypsometer is much less difficult than building a mercury or an aneroid barometer. Both the tube of the mercury barometer and the cell of the aneroid must be evacuated to very little pressures while with the hypsometric device, the low pressure is not as critical.

Obviously many modifications and variations of the present invention are possible in the light of the above teachings. It is therefore to be understood that within the scope of the appended claims the invention may be practiced otherwise than as specifically described.

I claim:

1. Pressure-subtracting hypsometric apparatus comprising:
   an elongate member having a manometric-type tubular column portion open to the atmosphere at one of its ends, said elongate member also having a closed hypsometric chamber portion communicating with the other end of said manometric tubular portion,
   a column of manometric liquid carried by said tubular portion,
   a volatile hypsometric liquid partially filling said chamber portion and having an interface resting on and immiscible with said manometric liquid,
   heating means for vaporizing said hypsometric liquid for producing a vapor pressure in said partially filled chamber sufficient to move said interface against atmospheric pressure to a predetermined fixed level,
   heat control means for continuously maintaining said fixed level,
   said control means being responsive to transitory pressure-induced fluctuating movements of said interface in either direction from said fixed level for selectively energizing or deenergizing said heating means sufficiently to promptly return the interface to said fixed level, and
   means for detecting the temperature of said hypsometric liquid when said interface is at said fixed level,
   whereby the atmospheric pressure is derivable by adding the pressure equivalent of said detected temperature to the pressure equivalent of the fixed-level manometric column.

2. The apparatus of claim 1 wherein:
   said hypsometric chamber portion is evacuated to minimize the effects of atmospheric pressure acting on its liquid contents, and
   said manometric liquid is mercury.

3. The apparatus of claim 1 wherein said temperature detecting means includes:
   a thermistor mounted on said hysometric chamber portion,
   a remotely disposed recorder, and
   means electrically coupling the thermistor output to said recorder.

4. The apparatus of claim 1 wherein said manometric liquid is mercury and said heat control means includes:
   a light source,
   electrical circuit means for energizing said heating means, and
   light responsive switching means for opening and closing said circuit,
   said light source having a beam intersecting said tubular column at said fixed level and said switching means being disposed in the path of said beam,
   said switching means closing said circuit at a preselected light intensity level and said hypsometric fluid being sufficiently light-transmissive to transmit said intensity level,
   said mercury alternating the light intensity sufficiently to open the circuit and interupt energization of the heating means,
   whereby movement of said interface through the beam path is capable of maintaining said fixed level by responsively energizing and deenergizing the heating means.

5. The apparatus of claim 1 further including temperature control means for insulating the apparatus for environmental temperature conditions, said temperature control means comprising:
   a metal container encasing the apparatus,
   heating means for maintaining the container at a preselected temperature, and
   heat-insulating means encasing the container.

6. The apparatus of claim 4 wherein said heat control means further includes:
   means for controlling the intensity of said light source for causing said heating means to be alternately switched on and off when said interface is intersected by the beam.

7. The apparatus of claim 5 wherein said means for controlling the light source intensity includes:
   light-responsive circuit means for producing a light beam having an intensity varying between fixed intensity levels,
   said light responsive switching means of said heat control circuit being responsive to said light beam intensity for alternately switching said heating means on or off.

* * * * *